UNITED STATES PATENT OFFICE.

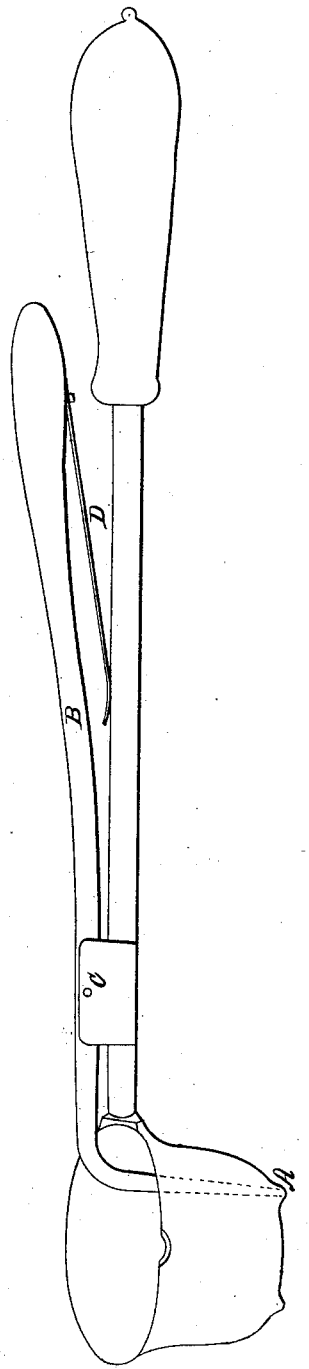

GEORGE RUGG, OF POTSDAM, NEW YORK.

IMPROVED BULLET-LADLE.

Specification forming part of Letters Patent No. 28,013, dated April 24, 1860.

*To all whom it may concern:*

Be it known that I, GEORGE RUGG, of the town of Potsdam, in the county of St. Lawrence and State of New York, have invented a new and Improved Bullet-Ladle for the Purpose of Casting Bullets, Toys, &c., in a more perfect and convenient manner than can be done by the common ladle; and I do hereby declare that the following is a full description thereof, reference being had to the accompanying drawing, and to the letters of reference marked thereon.

The nature of my invention consists in providing the bottom of the ladle with an aperture, which aperture is to be closed by the end of the lever, and which aperture, by means of the lever, can be opened or closed at pleasure.

To enable others skilled in the art to make and use my invention, I will proceed to describe its construction and operation.

I construct my ladle of the usual material and in the usual form, and provide an aperture in the bottom at A, as shown in the accompanying drawing; and attached to the handle is a lever, B, which extends from the hand of the operator to the aperture in the bottom of the ladle. The said lever is held in place by the pivot, as seen at C. There is a spring, D, attached to the lever to keep the opposite end firmly closed on the aperture at A.

The operation is as follows: Put the metal into the ladle and bring it to the melted state by heat. Then take the ladle by the hand-piece and bring the aperture A over the molds, then press down the lever with the thumb, and the molds will be filled in a perfect manner.

What I claim as my invention, and desire to secure by Letters Patent, is—

The construction of the ladle with an aperture, A, and the lever B to close the aperture at A, and to operate substantially as described.

GEORGE RUGG.

Witnesses:
G. M. HOWE,
JAMES L. SIMONS.